(12) United States Patent
Kitamura et al.

(10) Patent No.: US 6,396,923 B1
(45) Date of Patent: May 28, 2002

(54) PORTABLE TERMINAL DEVICE (75) Inventors: Toshiyasu Kitamura, Kanagawa; Kazuhiro Konishi, Shizuoka, both of (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/437,504

(22) Filed: Nov. 10, 1999

(30) Foreign Application Priority Data

Nov. 10, 1998 (JP) .......................................... 10-319361

(51) Int. Cl.[7] .............................................. H04M 1/00
(52) U.S. Cl. .............................. 379/433.01; 379/433.08
(58) Field of Search ............. 455/90, 575; 379/433.08, 379/433.01

(56) References Cited

U.S. PATENT DOCUMENTS 4,912,602 A * 3/1990 Zurek .......................... 455/90

* cited by examiner

Primary Examiner—Jack Chiang
Assistant Examiner—Rasha Al-Aubaidi
(74) Attorney, Agent, or Firm—Pearne & Gordon LLP (57) ABSTRACT The present invention is for providing a portable terminal device with improved mechanical strength and rigidity of a case so as to prevent damage of functional parts with respect to bend or twist deriving from a small size and a thin shape of the portable terminal device main body, which comprises a printed board with mounting parts mounted thereon, a lower case with receiving ribs provided corresponding to the arrangement position of the mounting parts for receiving the mounting parts, and a battery case provided below the lower case for supporting deformation of the lower case.

5 Claims, 8 Drawing Sheets

PORTABLE TERMINAL DEVICE

BACKGROUND OF THE INVENTION

1. Field of the Invention

The present invention relates a portable terminal device, in particular, to the structure of a case for containing functional parts of a portable phone and a PHS. Specifically, the present invention relates to a configuration for improving the mechanical strength and the rigidity of the case in light of a smaller size and a thinner shape of a portable terminal device main body so as to prevent damage of the functional parts caused by bend or twist.

2. Description of the Related

Recently, manufacturers of portable terminal devices, in particular, portable phones and PHS are actively striving for new product developments to achieve a smaller size, a light weight and a thinner shape of the portable terminal devices. According to such a trend, the mechanical strength of the case for containing a portable terminal device main body tends to be vulnerable due to a thinner shape of the case and deterioration of the rigidity of the case.

The configuration of a conventional portable terminal device, such as a portable phone and a PHS will be explained hereinafter with reference to FIGS. 6 to 10.

Figure 6:
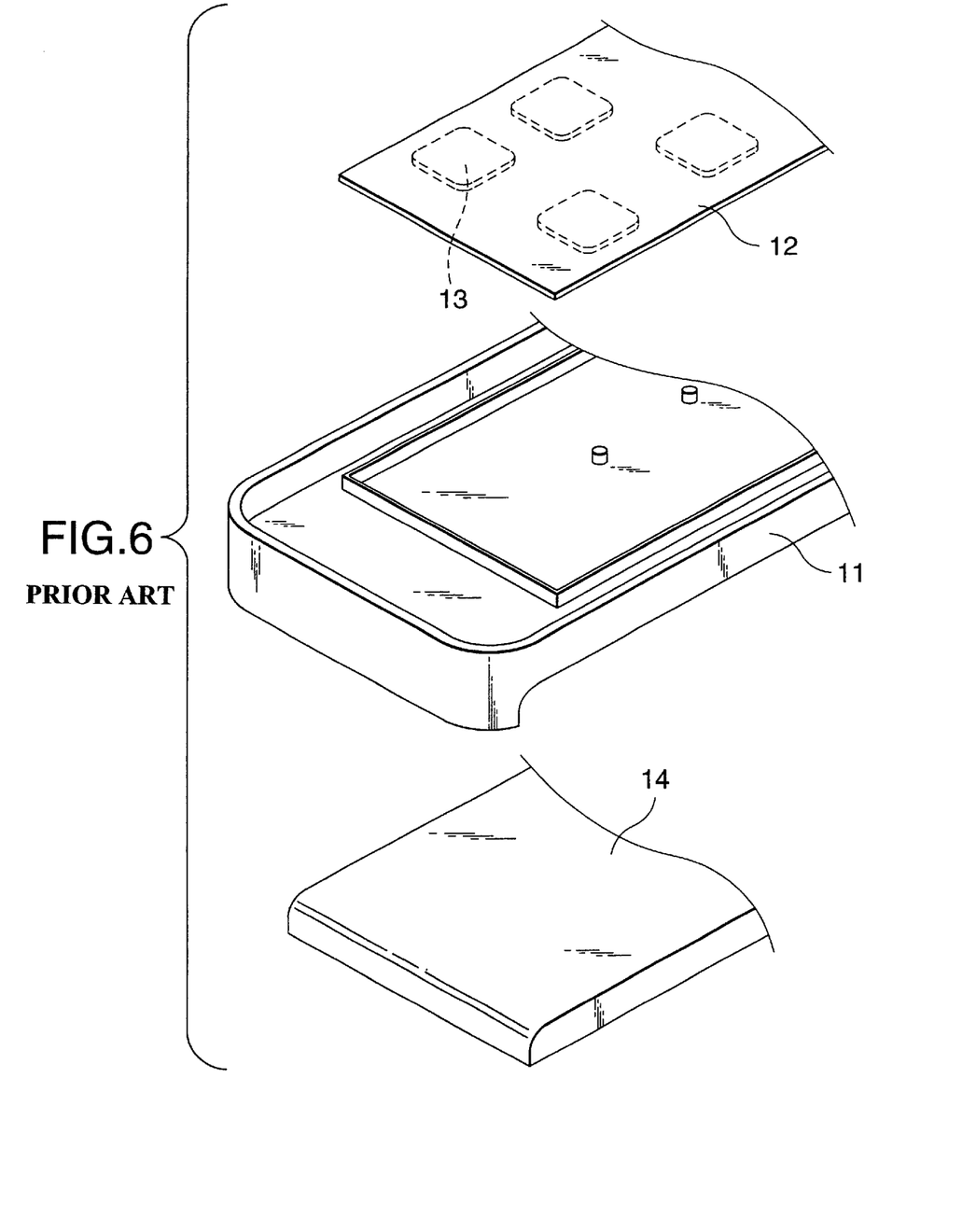
FIG. 6 is a diagram showing the configuration of a conventional portable terminal device.

FIG. 6 shows a configuration of the conventional portable terminal device. In FIG. 6, the portable terminal device is provided such that a printed board 12 with mounting parts 13 mounted thereon is mounted on a lower case 11 from above, and further, a battery 14 is also mounted thereon from below.

As is known conventionally, since a large number of small parts other than the mounting parts 13 are also mounted on the printed board 12 and wiring is also provided thereon, in accommodating the printed board 12 into the lower case 11, the printed board 12 is placed with a contacting surface disposed appropriately such that the printed board 12 is mounted horizontally, without contacting with the mounting parts 13.

Figure 7:
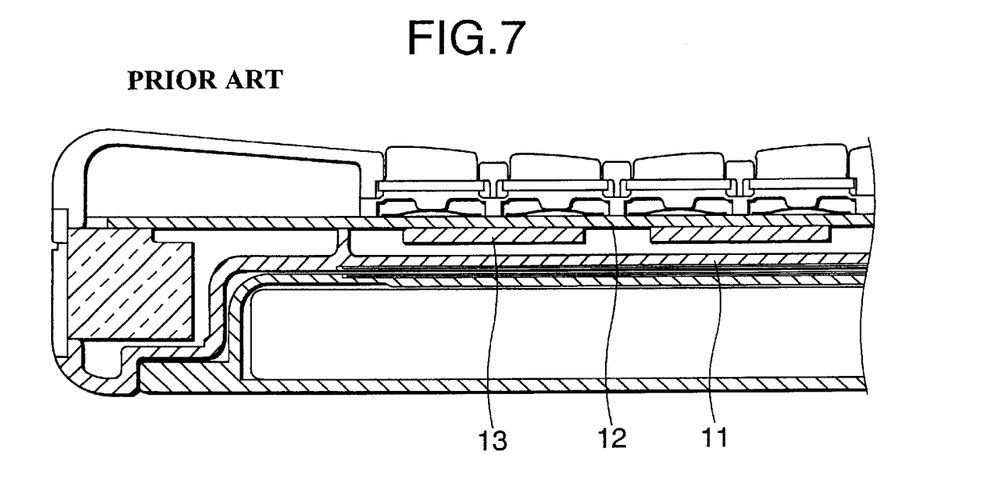
FIG. 7 is a side cross-sectional view showing the accommodating configuration of the conventional portable terminal device.

FIG. 7 is a side cross-sectional view showing the accommodating configuration of the portable terminal device accordingly provided. In FIG. 7, which shows the relative arrangement relationship among the lower case 11, the printed board 12 and the mounting parts 13 apparently, the mounting parts 13 are not supported by the lower case 11.

Figure 8:
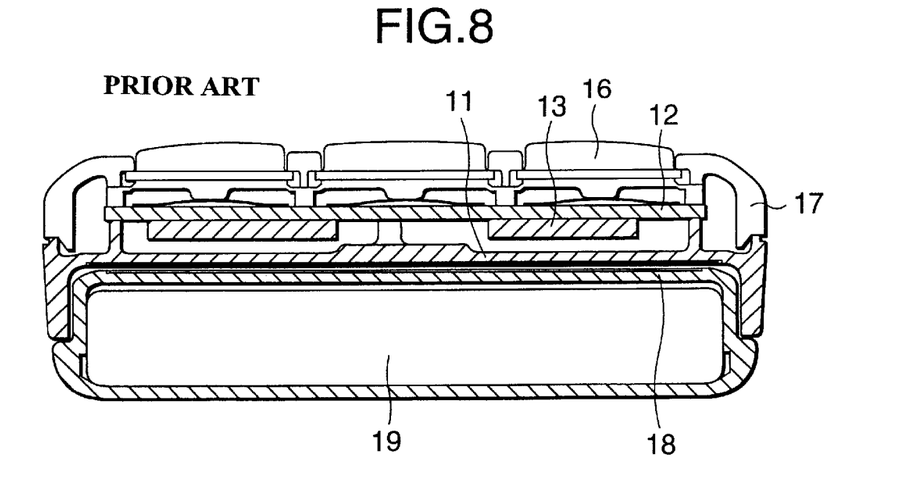
FIG. 8 is another side cross-sectional view showing the accommodating configuration of the conventional portable terminal device.

FIG. 8 is a side cross-sectional view showing the accommodating configuration of the portable terminal device, viewed from a side different from that of FIG. 7. Also in FIG. 8, which shows the relative positional relationship among the lower case 11, the printed board 12 and the mounting parts 13 apparently, it is observed that the mounting parts 13 are not supported by the lower case 11. Moreover, a contacting surface for supporting the printed board 12 at the center is also shown in FIG. 8. It is observed that the contacting surface is disposed such that the printed board 12 is placed horizontally, without contacting with the mounting parts 13 as mentioned above. In FIG. 8, key buttons 16, an upper case 17, a battery case 18 and a battery cell 19 are also shown as components of the portable terminal device.

Figure 9:
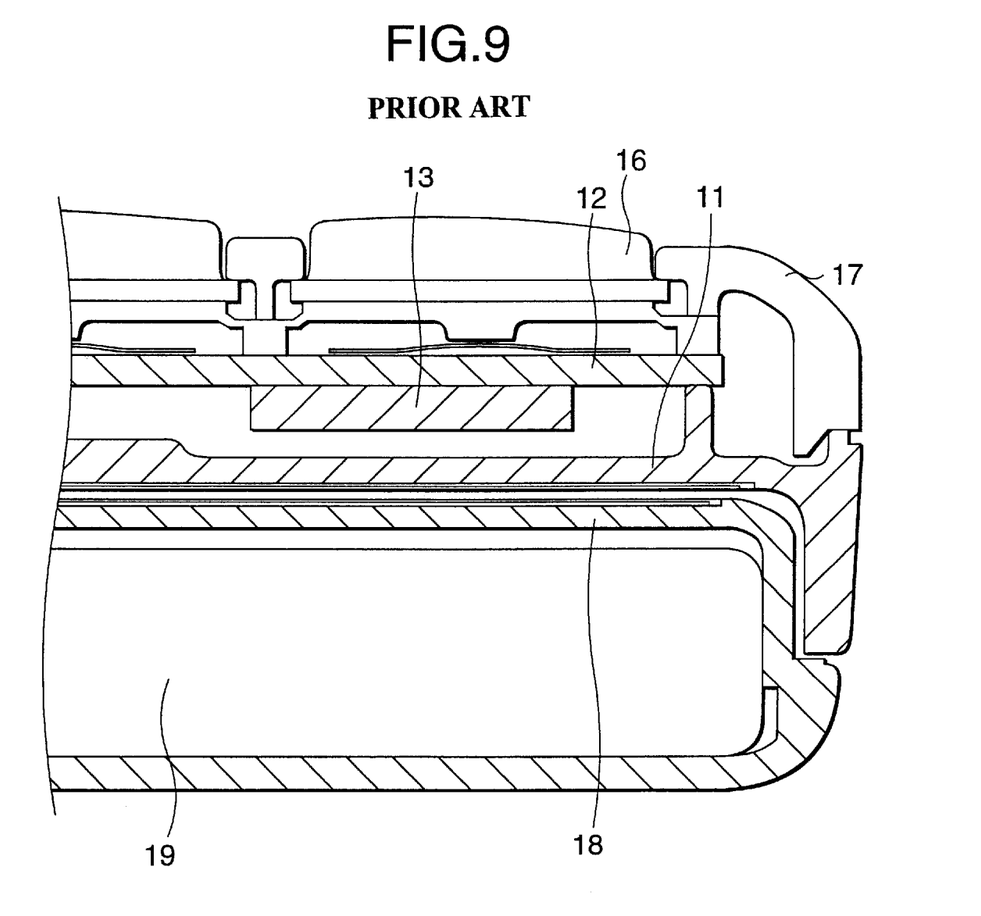
FIG. 9 is a partial enlarged side cross-sectional view of FIG. 8.

FIG. 9 is a partial enlarged side cross-sectional view of FIG. 8. What is important in FIG. 9 is the positional relationship among the lower case 11, the printed board 12 and the mounting parts 13. FIG. 9 shows the positional relationship before starting operation.

Figure 10:
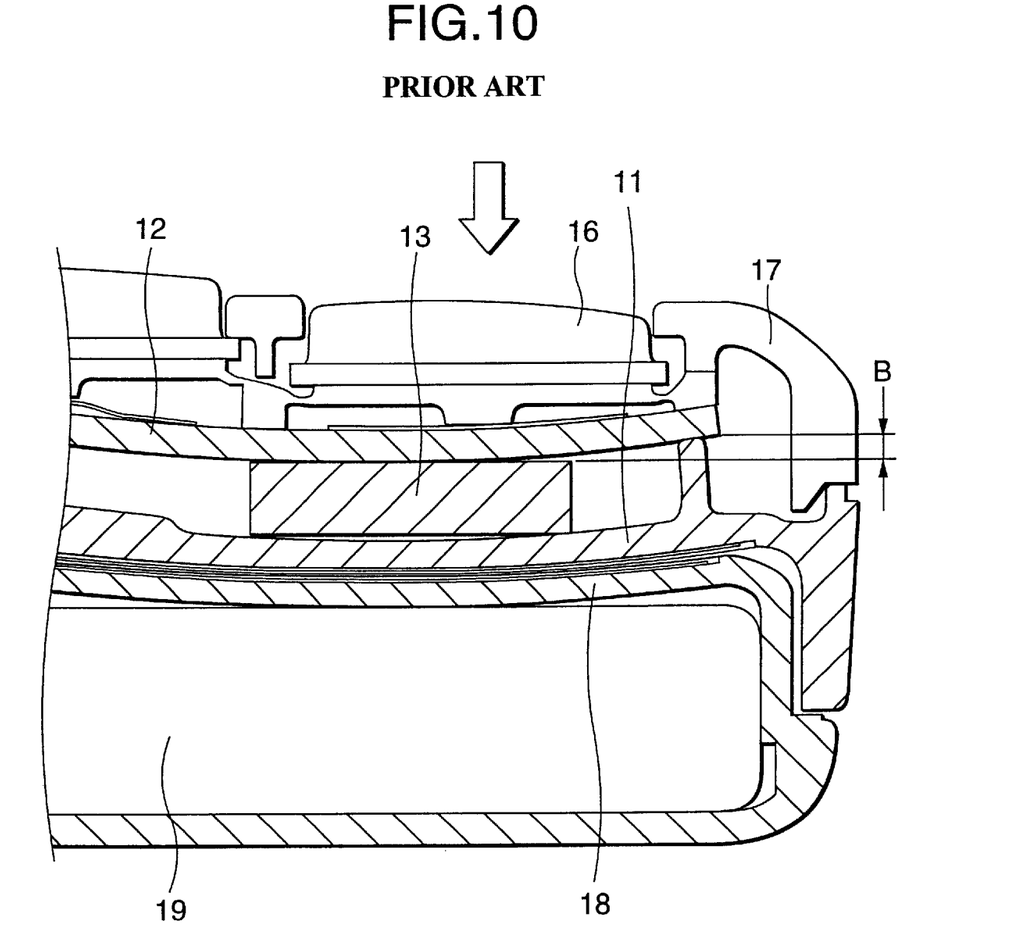
FIG. 10 is a side cross-sectional view in operation when the key button is pressed in FIG. 9.

FIG. 10 is a side cross-sectional view of the device of FIG. 9 in operation when the key button 16 is pressed from the arrow direction. In FIG. 10, a problem is involved in that when the key button 16 is pressed, the printed board 12 is deformed, then the mounting parts 13 are deformed, and further, the mounting parts 13 come in contact with the lower case 11 so that the lower case 11 is deformed as well. Furthermore, a problem arises in that the battery case 18 is deformed according to the deformation of the lower case 11.

FIG. 10 shows the deformation amount B of the printed board 12 according to the press of the key button 16. If the deformation amount is less than this, the above-mentioned deformation problem is not arisen. However, in the current circumstances wherein a thinner shape of the case and the rigidity decline of the case results in vulnerability in terms of the mechanical strength according to the trend of a smaller size, a light weight and a thinner shape as mentioned above, a problem is involved in that the deformation amount of the conventional configuration exceeds the tolerable range.

SUMMARY OF THE INVENTION

An object of the present invention is to solve the aforementioned conventional problems and to provide a portable terminal device with a configuration having improved mechanical strength and rigidity of a case so as to prevent damage of functional parts with respect to bend or twist deriving from a small size and a thin shape of the portable terminal device main body.

According to the present invention, there is provided a portable terminal device comprising a printed board with mounting parts mounted thereon, a lower case with receiving ribs provided corresponding to the arrangement position of the mounting parts for supporting the mounting parts, and a battery case provided below the lower case for supporting deformation of the lower case.

According to the configuration, a portable terminal device with a configuration having improved mechanical strength and rigidity of a case so as to prevent damage of functional parts with respect to bend or twist deriving from a small size and a thin shape of the portable terminal device main body can be provided.

DETAILED DESCRIPTION OF THE PRESENT INVENTION

Hereinafter, the present invention will be described in detail with reference to FIGS. 1 to 5.

Figure 1:
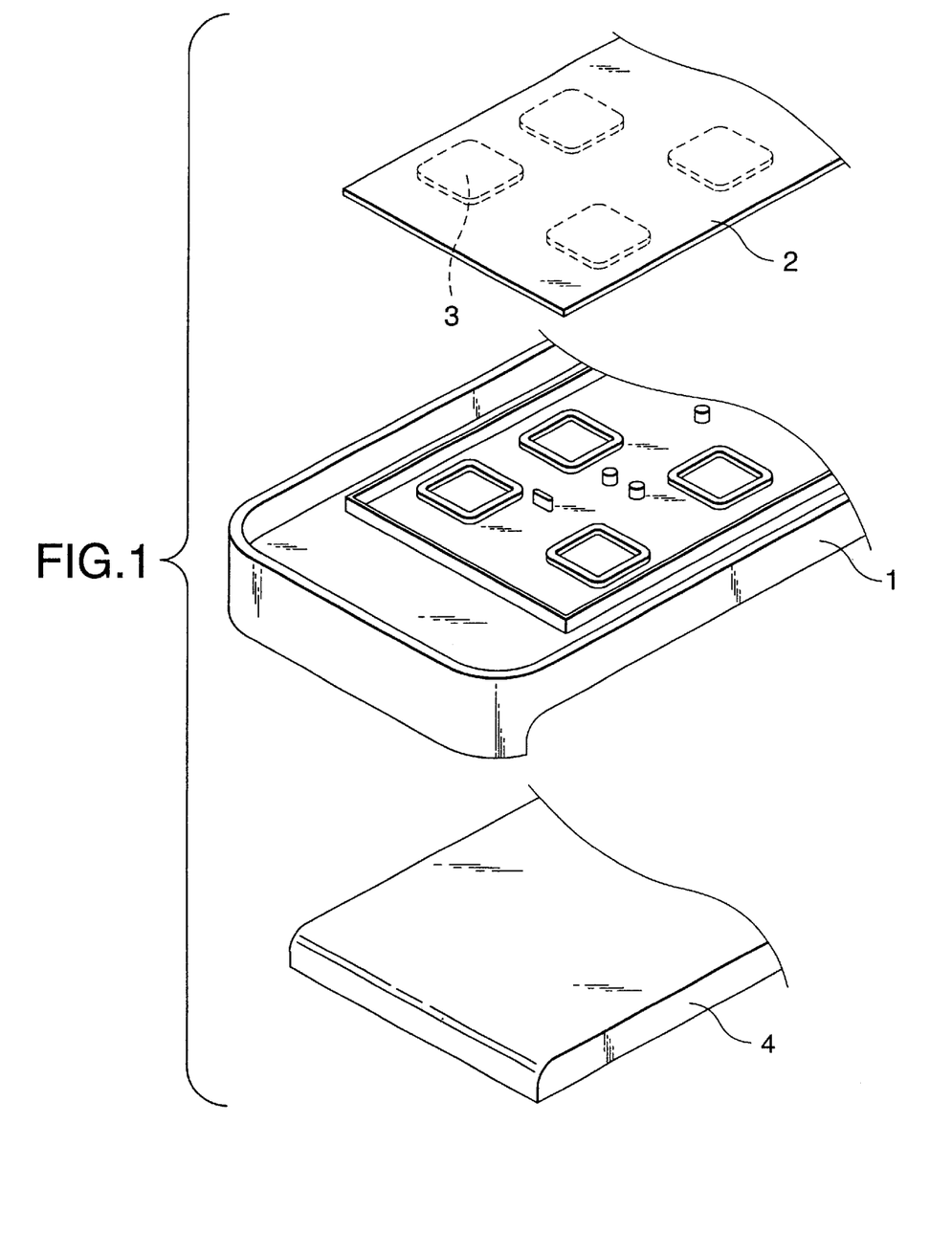
FIG. 1 is a diagram showing the configuration of a portable terminal device according to an embodiment of the invention.

FIG. 1 is a diagram showing a configuration of a portable terminal device according to an embodiment of the invention. In FIG. 1, the portable terminal device is provided such that a printed board 2 with mounting parts 3 mounted thereon is mounted on a lower case 1 from above, and further, a battery 4 is also mounted thereon from below.

A large number of small parts other than the mounting parts 3 are also mounted on the printed board 2 and wiring is also provided thereon. The lower case 1 of the portable terminal device according to the embodiment of the invention comprises rectangular ribs provided corresponding to the arrangement position of the mounting parts 3 for supporting the mounting parts, in addition to the conventional contacting surface. Then, the printed board 2 is placed on the lower case 1. The shape of the ribs is not limited to the rectangular shape, but a round or oval shape can be adopted, or a key-like shape for supporting only the four corners of the mounting parts 3 can also be adopted. Moreover, the inside of the shape may be mesh-like. It is preferable that the ribs are provided in points corresponding mainly to the mounting parts, in particular, packaged functional parts.

Figure 2:
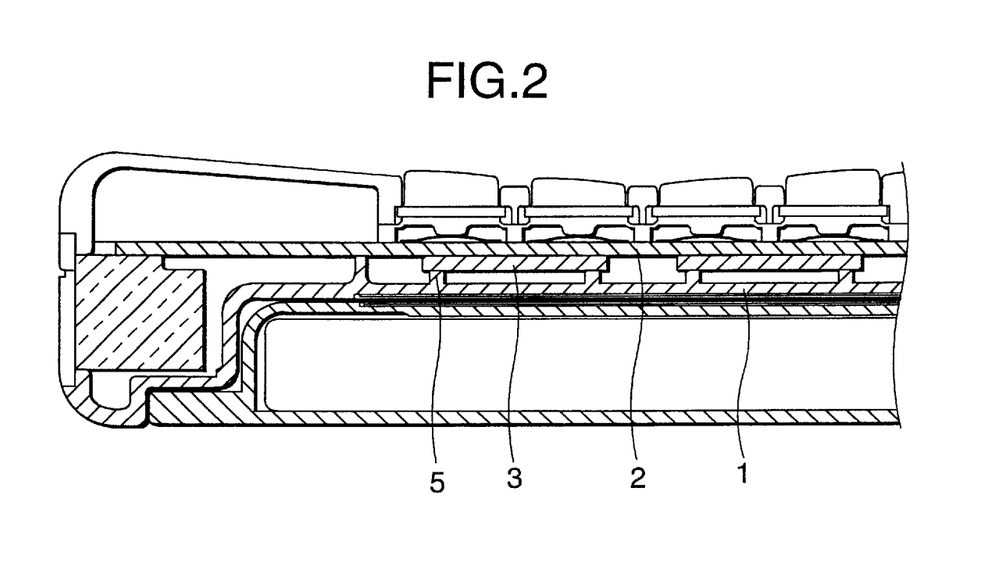
FIG. 2 is a side cross-sectional view showing the accommodating configuration of the portable terminal device according to the embodiment of the invention.

FIG. 2 is a side cross-sectional view showing the accommodating configuration of the portable terminal device accordingly provided. In FIG. 2, which shows the relative arrangement relationship among the lower case 1, the printed board 2, the mounting parts 3 and the receiving ribs 5 apparently, the mounting parts 3 are supported by the receiving ribs 5 provided in the lower case 1.

Figure 3:
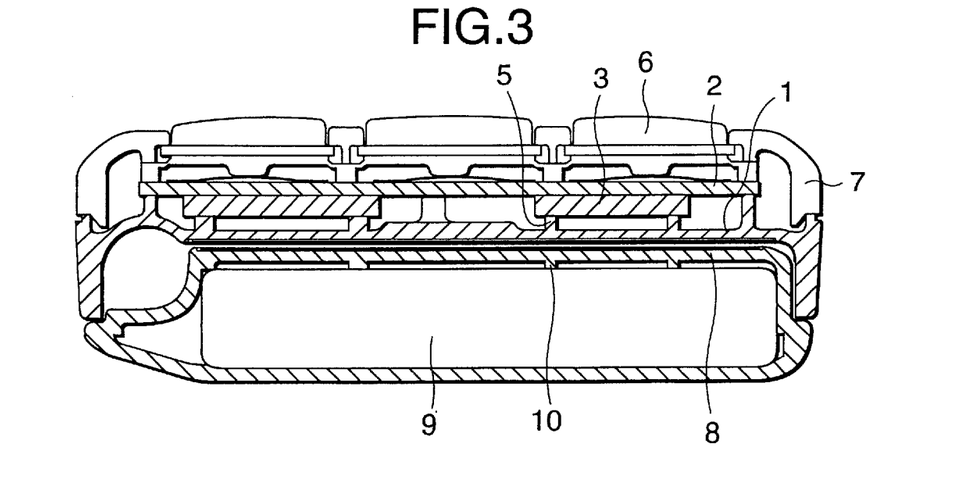
FIG. 3 is another side cross-sectional view showing the accommodating configuration of the portable terminal device according to the embodiment of the invention

FIG. 3 is a side cross-sectional view showing the accommodating configuration of the portable terminal device according to the embodiment of the invention, viewed from a side different from that of FIG. 2. Also in FIG. 3, which shows the relative positional relationship among the lower case 1, the printed board 2, the mounting parts 3 and the receiving ribs 5 apparently, it is observed that the mounting parts 3 are supported by the receiving ribs 5 provided in the lower case 1. Moreover, a contacting surface for supporting the printed board 2 at the center is also shown in FIG. 3. The contacting surface is disposed such that the printed board 2 is placed horizontally, without contacting with the mounting parts 3. In FIG. 3, key buttons 6, an upper case 7, a battery case 8, a battery cell 9 and receiving ribs 10 provided in the battery case 8 are also shown as components of the portable terminal device. The shape of the ribs is not limited to the rectangular shape, but a round or oval shape can be adopted, or a key-like shape for supporting only the four corners can also be adopted. Moreover, the inside of the shape may be mesh-like.

Figure 4:
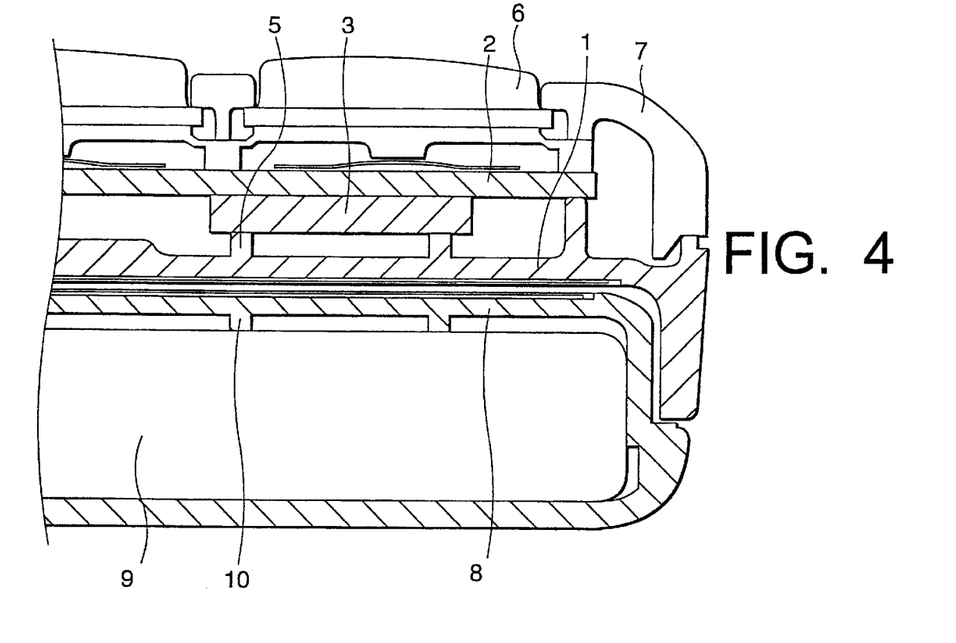
FIG. 4 is a partial enlarged side cross-sectional view of FIG. 3.

FIG. 4 is a partial enlarged side cross-sectional view of FIG. 3. What is important in FIG. 4 is the positional relationship among the lower case 1, the printed board 2, the mounting parts 3, the receiving ribs 5 and the receiving ribs 10. FIG. 4 shows the positional relationship before starting operation.

Figure 4A:
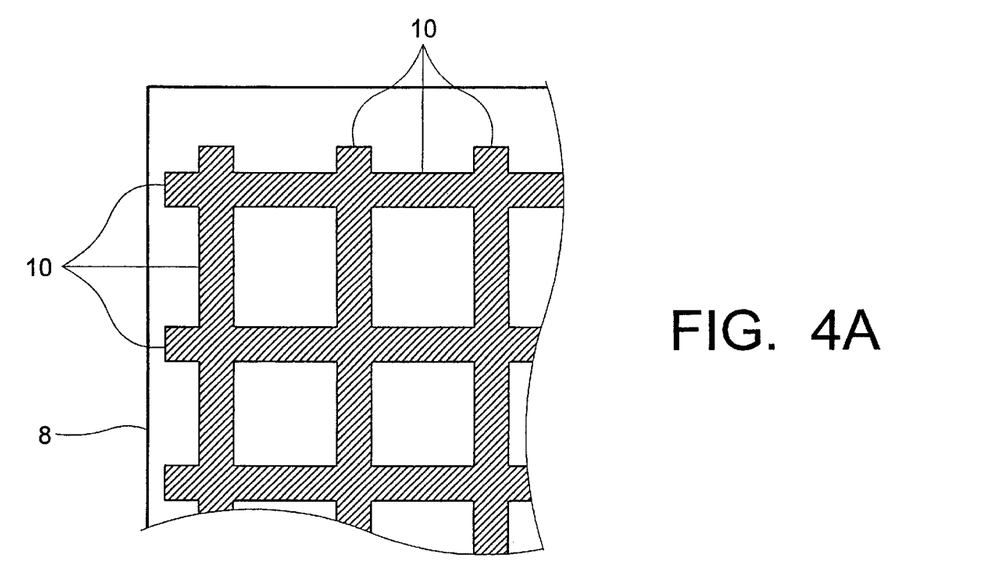
FIG. 4A is a partial enlarged plan view of the battery case with ribs arranged as a mesh.

FIG. 4A shows the battery case 8 with a plurality of receiving ribs 10 arranged in a mesh-like configuration for limiting the deformation of the case and/or printed board. Likewise, said receiving ribs 5 could be arranged in a similar mesh-like configuration to provide added support to the print board 2.

Figure 5:
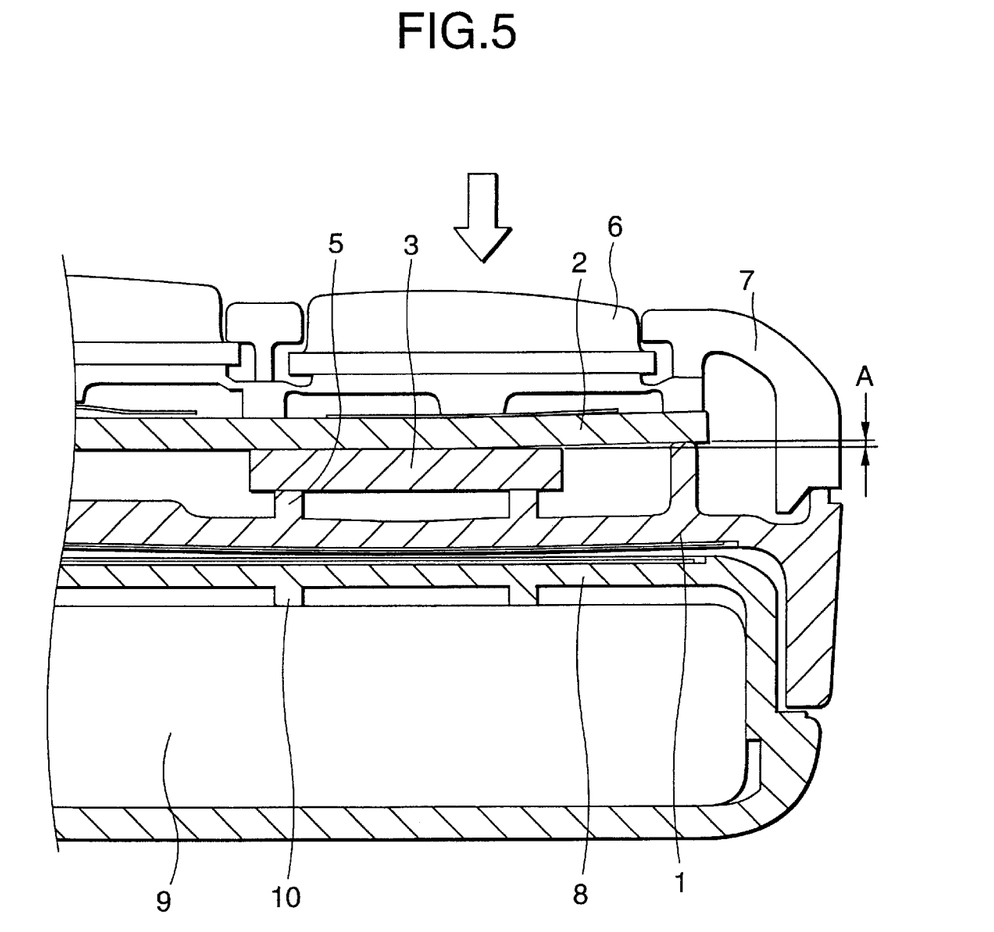
FIG. 5 is a side cross-sectional view in operation when the key button is pressed in FIG. 4.

FIG. 5 is a side cross-sectional view of the device of FIG. 4 in operation when the key button 6 is pressed from the arrow direction. In FIG. 5, although the printed board. 2 is deformed according to the press of the key button 6, since the mounting parts 3 are supported firmly by the receiving ribs 5 without generating deformation, the lower case 1 is pressed accordingly so as to be deformed.

With the premise that the battery case 8 is deformed due to a large deformation amount of the lower case 1, the receiving ribs 10 provided in the battery case 8 at the position corresponding to the receiving ribs 5 provided in the lower case 1 come in contact with the battery cell 9. However, since the surface of the battery cell is made from a metal, deformation is not generated so that unlike the conventional example, there is no risk of function failure of the mounting parts due to a large deformation.

FIG. 5 shows the deformation amount A of the printed board 2 according to the press of the key button 6. Since it is much smaller than the deformation amount B of the conventional printed board, even with a thinner shape of the case or a declined rigidity of the case itself according to the trend of a smaller size, a light weight and a thinner shape as mentioned above, the maximum range is the deformation amount A of the printed board 2, and thus unlike the conventional example, there is no risk of function failure of the mounting parts due to a large deformation.

As heretofore mentioned, since a portable terminal device according to the invention comprises a printed board with mounting parts mounted thereon, a lower case with receiving ribs provided corresponding to the arrangement position of the mounting parts which support the mounting parts, and a battery case provided below the lower case for supporting deformation of the lower case, the effect of improved mechanical strength and rigidity of a case so as to prevent damage of functional parts with respect to bend or twist deriving from a small size and a thin shape of the portable terminal device main body can be achieved.

What is claimed is:

1. A portable terminal device comprising:
   a printed board;
   a plurality of mounting parts mounted on said printed board;
   a lower case having a plurality of receiving ribs arranged in a manner corresponding to positions of said mounting parts, wherein said plurality of receiving ribs support said plurality of mounting parts; and
   a battery case provided below said lower case for preventing deformation of said lower case.

2. The portable terminal device according to claim 1, wherein a plurality of receiving ribs are provided in said battery case.

3. The portable terminal device according to claim 2, wherein said plurality of receiving ribs in said battery case are provided with the same positional relationship as said plurality of the receiving ribs in said lower case.

4. The portable terminal device according to claim 3, wherein said plurality of receiving ribs in said battery case is arranged in a form of a mesh.

5. A portable terminal device comprising:
   a printed board;
   a plurality of mounting parts mounted on said printed board; and
   a lower case having a plurality of receiving ribs arranged in a manner corresponding to positions of said mounting parts, wherein said plurality of receiving ribs support said plurality of mounting parts.

* * * * *